(12) United States Patent
Bohlender et al.

(10) Patent No.: US 7,667,165 B2
(45) Date of Patent: Feb. 23, 2010

(54) ELECTRIC HEATING DEVICE FOR MOTOR VEHICLES

(75) Inventors: Franz Bohlender, Kandel (DE); Michael Zeyen, Landau/Queichheim (DE); Michael Niederer, Kapellen-Drusweiler (DE)

(73) Assignee: Catem GmbH & Co., LG (DE)

( * ) Notice: Subject to any disclaimer, the term of this patent is extended or adjusted under 35 U.S.C. 154(b) by 258 days.

(21) Appl. No.: 11/054,860

(22) Filed: Feb. 9, 2005

(65) Prior Publication Data

US 2005/0230377 A1 Oct. 20, 2005

(30) Foreign Application Priority Data

Feb. 10, 2004 (EP) .................................. 04002958

(51) Int. Cl.
*H05B 3/06* (2006.01)
(52) U.S. Cl. ................ 219/536; 219/201; 219/202; 219/505; 219/548; 392/347; 392/423; 392/422; 392/435
(58) Field of Classification Search ................ 219/536, 219/505, 201, 202, 481, 504, 540, 548, 347, 219/360, 486, 492, 205; 392/347, 360, 423, 392/422, 435
See application file for complete search history.

(56) References Cited

U.S. PATENT DOCUMENTS

| | | | | |
|---|---|---|---|---|
| 5,057,672 A | * | 10/1991 | Bohlender et al. | 219/540 |
| 5,256,857 A | * | 10/1993 | Curhan et al. | 219/202 |
| 5,377,298 A | * | 12/1994 | Yang | 392/360 |
| 5,562,844 A | * | 10/1996 | Bohlender et al. | 219/540 |
| 5,995,711 A | * | 11/1999 | Fukuoka et al. | 392/347 |
| 6,037,567 A | * | 3/2000 | Inoue et al. | 219/202 |
| 6,392,207 B2 | * | 5/2002 | Beetz et al. | 219/530 |
| 6,919,535 B2 | * | 7/2005 | Uhl et al. | 219/202 |
| 6,940,050 B2 | * | 9/2005 | Probst | 219/486 |
| 7,026,584 B2 | * | 4/2006 | Bohlender | 219/548 |

FOREIGN PATENT DOCUMENTS

DE 199 11 547 A1 9/2000

\* cited by examiner

*Primary Examiner*—Tu B Hoang
*Assistant Examiner*—Vinod D Patel
(74) *Attorney, Agent, or Firm*—Boyle Fredrickson, S.C.

(57) ABSTRACT

An auxiliary heater for motor vehicles includes an open housing accommodating a layered structure which includes at least one radiator element and at least one heat-emitting element having at least one PTC heating element, and further accommodating at least one spring element pretensioning the layered structure, a plurality of contacts being held in said housing in an insulating manner and electrically connected to the at least one PTC heating element. The layered structure is pretensioned by a displacer which is inserted into a lower housing component when the elements of the layered structure have been inserted in the lower housing component in a tension-free manner. The displacer is inserted into the lower housing component in a direction approximately perpendicular to the plane of the layered structure and, in the mounted position, it is secured in position relative to said lower housing component.

51 Claims, 5 Drawing Sheets

ELECTRIC HEATING DEVICE FOR MOTOR VEHICLES

BACKGROUND OF THE INVENTION

1. Field of the Invention

The present invention relates to an electric heating device used in particular as an auxiliary heating for motor vehicles comprising a housing accommodating a layered structure which includes at least one radiator element and at least one heat-emitting element with at least one PTC heating element, and further accommodating at least one spring element which pretensions said layered structure, a plurality of contacts being held in said housing in an insulating manner and electrically connected to the at least one PTC heating element.

The present invention additionally concerns a method for producing an electric heating device of the above-mentioned type.

2. Description of the Related Art

In motor vehicles, and in particular in motor vehicles with new consumption-optimized internal combustion engines where a smaller amount of thermal energy is produced, auxiliary electric heatings are used for heating the vehicle interior and the engine. Such electric heating devices are, however, also suitable to be used for other purposes, e.g. in the field of domestic installations, especially room air conditioning, in industrial plants and the like.

SUMMARY OF THE INVENTION

The heating elements used for such an auxiliary electric heating for a motor vehicle are preferably PTC heating elements with corrugated ribs connected in a heat-conducting arrangement. The heat produced by the PTC heating elements is transferred to air flowing through an air duct via the corrugated ribs. The whole arrangement, which comprises a layered structure of PTC heating elements, radiator elements and contact sheets for power supply, is clampingly held in a frame so as to increase the efficiency of the heating unit. By means of said clamping, high electric and thermal contacting is achieved in the PTC heating elements. The countersurface for the PTC heating elements is defined e.g. by sheet-metal strips which are arranged preferably such that they extend parallel to one another and enclose one or a plurality of PTC heating elements, said sheet-metal strips defining together with the intermediate PTC heating elements a heat-emitting element. This embodiment is preferably used for a layered structure comprising a radiator element formed of a meandrous sheet-metal strip, i.e. a corrugated-rib radiator element. Alternatively, the flat contact surface for the PTC heating elements can also be defined by the outer surface of an extruded aluminium profile, which defines the radiator element. In the case of this embodiment, the outer surfaces of the extruded aluminium profile can be regarded as part of the heat-emitting element. According to both alternatives, the contact surfaces for the PTC heating elements are electrically conductive and they are electrically connected to the contacts held in the housing. In the case of the first embodiment, the contacts are normally formed by exposed ends of the sheet-metal strips.

The layered structure is held in a robust frame having preferably a U-shaped cross-section. Said frame is preferably implemented such that the layered structure is held therein in a pretensioned condition. The clamping can, alternatively, be effected by spring elements which are arranged in said layered structure. The frame is provided with a mechanically particularly stable structural design, preferably with a U-shaped cross-section, so as to be able to absorb the spring forces. Such a conventional heating device is known from DE-A-101 21 568, which can be regarded as the device underlying the generic clause of claim 1.

The minimum height of the longitudinal bars of such a frame having a U-shaped cross-section (or a C-shaped cross-section according to DE-A-101 21 568) is approximately 11 mm in the case of the clamping forces required. Taking into account the heating device in its entirety, this will result in a height of at least 22 mm that cannot be utilized for the air duct. In such a structural design comprising outer clamping means and an outer holding frame, respectively, a high percentage of the area available can therefore not be used for conducting air therethrough. Hence, such electric heating devices are not suitable for use in cases where the installation height is very low.

In addition, when electric heating devices comprising an outer holding frame and outer clamping means, respectively, are mounted, complicated measures have to be taken, which counteract the pressure which is exerted by the spring(s) of the frame and which impedes the mounting process.

In view of these disadvantages, heating devices having a conventional holding frame are becoming less and less suitable for modern heating/air-conditioning units, in particular when these units are installed in motor vehicles. Heating/air-conditioning units for multi-zone air conditioning in high-convenience motor vehicles require to an increasing extent heating devices having a great length but a small construction height.

In addition, conventional structural designs comprising a holding frame have a high weight, in particular when said frame is made of metal. With regard to the total weight of the motor vehicle, it is, however, desirable that auxiliary electric heatings having a particularly low weight can be used for installation in the vehicle in question.

Another disadvantage of metal holding frames is to be seen in their conductive surface. In order to increase the safety in motor vehicles, metal surfaces are avoided to an increasing extent, so that the surfaces in question can be touched free from danger, i.e. without electric or thermal conduction. For this purpose, the above-described heating devices are preferably provided with a cover of plastic material, such as e.g. the heating device shown in DE-A-101 21 568.

Furthermore, special problems arise from a structural design of the electric heating device which makes sense from the point of view of production technology and which easily allows a pretensioned mode of arrangement of the layered structure. According to DE-A-101 21 568 it is suggested that, by means of two longitudinal legs and two transverse legs, the housing should be implemented such that the transverse legs comprise encompassing portions which are provided at the ends thereof and by means of which they outwardly encompass the corresponding ends of the longitudinal legs in the transverse direction and in safe engagement therewith. In the case of this embodiment, the longitudinal legs are first attached to one of the transverse legs by insertion in the encompassing portions formed on these transverse legs and, subsequently, they are pivoted towards one another and about the encompassing portions in a scissor movement. In the course of this process, the spring included in the layered structure is compressed. The other ends of the longitudinal legs are now inserted into the encompassing portions formed on the additional transverse leg. The framelike housing is now closed and the layered structure is held under pretension. This known approach to a solution is disadvantageous insofar as the mounting of the layered structure takes place under pretension. Hence, the individual elements of the layered structure must reliably be held in position during the mounting operation.

In the case of another approach to a solution known from DE 197 06 199, the housing is formed by a frame of plastic material whose longitudinal legs are slightly convex towards the inner side. The framelike housing is formed of a thermoplastic. The inwardly convex longitudinal legs of the framelike housing embody the spring elements in the sense of the present invention and compress the layered structure held in the housing. In the case of this known suggested solution, the layered structure comprises sheet-metal strips with intermediate PTC heating elements and with radiator elements extending parallel thereto, said radiator elements being defined by meandrous, bent sheet-metal strips. When the known heating device is mounted, the longitudinal legs must be bent elastically outwards. The mounting space which is then available is comparatively small, and this makes mounting even more difficult.

According to an alternative approach to a solution, which is also known from DE 197 06 199, the housing is defined by a two-part frame which is made of a thermoplastic material and which has a parting plane that extends transversely to the transverse legs and transversely to the plane defined by the frame. The two frame components are adapted to be moved towards one another in the direction of the transverse legs and, when mounting has been finished, they are pretensioned relative to one another via spring elements which fix the transverse legs segments of the two frame components relative to one another under pretension. This second approach to a solution according to DE 197 06 199 was not able to gain acceptance in practice, since the structural design of the frame-shaped housing is comparatively complicated. In addition, the spring elements are subjected to a tensile load on the outer side of the housing and cannot guarantee with the necessary certainty the contact pressure required with respect to a good thermal and in particular a good electrical contact between the PTC heating elements and the contact surface for the given long service life of the electric heating device.

The present invention is based on the problem of providing a heating device of the type specified at the beginning whose layered structure can be mounted more easily to the housing. In addition, the present invention is based on the problem of providing a simple method for producing an electric heating device of the type specified at the beginning.

For solving the device problem according to the present invention, the invention suggests that the electric heating device specified at the beginning should be further developed in such a way that the housing comprises a lower housing component with at least one pretensioning element which, for applying the pretension, is adapted to be inserted into said lower housing component in a direction approximately perpendicular to the plane of the layered structure and which, in the mounted position, is adapted to be secured in position relative to said lower housing component.

In the electric heating device according to the present invention, the housing comprises a lower housing component which is suitable for accommodating the layered structure. The parts of the layered structure, viz. the at least one heat-emitting element as well as one or a plurality of radiator elements extending parallel to said heat-emitting element, are first inserted in the lower housing component without pretension. Also the electric connections between the PTC heating elements and the contacts are prepared. The contacts are optionally secured directly to the lower housing component, if desired as a part of sheet-metal strips extending parallel to the radiator elements. The layered structure can additionally comprise one or a plurality of spring elements which are first introduced in the lower housing component without pretension. Alternatively, it is possible to implement and/or provide the spring as part of the housing on housing portions extending parallel to the elements of the layered structure. The elements defining the layered structure are then held with a small amount of play in the plane of the layered structure in the lower housing component. It follows that the parts of the layered structure are inserted in the lower housing component without any necessity of holding parts of the housing under pretension and without any necessity of holding the parts of the layered structure under pretension in the premounted condition so as to encompass them by the housing.

When all the parts of the layered structure have been inserted in the lower housing component, at least one displacer is inserted in the lower housing component, the direction of insertion being approximately perpendicular to the plane of the layered structure. The insertion of the displacer in the lower housing component has the effect that the certain amount of play between the individual elements of the layered structure is eliminated and that the at least one spring element, which can be a part of the layered structure or which is accommodated in the housing by direct insertion into a part of said housing, is subjected to pretension. It follows that the displacer, when occupying its mounted position in which it is fixed relative to the housing, will pretension the spring element or the spring elements relative to the plane of the layered structure.

For simple pretensioning of the layered structure during insertion of the pretensioning element, the displacer is preferably wedge-shaped. The front end of the wedge-shaped displacer, which penetrates into the layered structure or between the layered structure and the housing during insertion of the displacer, has a width which is dimensioned such that the displacer can first be introduced in the lower housing component without applying any pretension. The wedge shape of the displacer is chosen such that, at the end of the insertion movement, i.e. when the mounted position has been reached, the layered structure is held under the necessary pretension.

In order to provide the best possible abutment for counteracting the pretensioning forces of the layered structure, it is suggested according to a further preferred embodiment that the displacer should comprise a web which, in the mounted position, projects up to and into the plane of the layered structure. According to this preferred embodiment of the heating device according to the present invention, the pretensioning forces introduced by the displacer are introduced in the layered structure essentially in the plane of said layered structure. In view of the fact that the layered structure is inserted in the lower housing component, the pretensioning forces introduced by the displacer are reliably counteracted by the lower housing component and held by positive engagement. Hence, there is no risk that the pretension of the layered structure may relax due to subsidence or the like, not even in the case of prolonged use of the electric heating device.

According to another perferred embodiment of the present invention, the spring element is provided on at least one border of the layered structure and the web comprises at least one run-down ramp tapering in the direction of insertion and cooperating with the spring element. This embodiment permits a plane-parallel arrangement of the components defining the layered structure, viz. the radiator element and the heat-emitting element. These elements, which extend in the longitudinal direction of the housing, have a substantially rectangular cross-sectional shape. The preferred embodiment especially permits the spring element to compensate the deviation from a plane-parallel arrangement of opposed contact surfaces, said deviation being caused by the wedge shape of the displacer. The preferred embodiment has additionally the advantage that the spring element, which does not contribute to the heating effect per se, is arranged on the boundary of the layered structure and can be accommodated fully or partly in the housing. Hence, the preferred further development allows a compact structural design of the electric heating device, and this will be of advantage especially when the heating device is used within a confined space, e.g. in the seat or in the H-pillar of a motor vehicle for ventilating the rear compartment or in the area of the head rests.

With respect to the best possible transmission of the pretension introduced in the layered structure, the web back facing away from the run-down ramp should, in the mounted position, preferably abut on the lower housing component.

For an accurate positioning of the PTC heating elements and with respect to a safe insulation of a plurality of PTC heating elements arranged one behind the other on a heat-emitting element in the longitudinal direction, positioning means should preferably be arranged on the lower housing component and used for prefixing the PTC heating element(s).

For captively securing the layered structure in the housing, it is suggested, according to a further preferred embodiment of the present invention, that the displacer should be arranged on an upper housing component which encompasses the layered structure from above. The upper housing component encompassing the layered structure from above engages all elements or individual elements of the layered structure on the upper surface facing away from the housing component. The lower surface of the layered structure preferably abuts on a base provided with one or a plurality of openings. On the basis of this preferred embodiment, the layered structure is captively held and positioned in the housing between the lower and the upper component thereof. In order to implement the longitudinal sides of the housing as rigidly as possible, the lower housing component and/or the upper housing component should preferably have provided thereon stiffening struts extending across the layered structure. These stiffening struts preferably abut on the end faces of the elements of the layered structure in the mounted position, and fix these end faces in position.

In order to allow the air to be heated to pass through the radiator elements as unhindered as possible, the stiffening struts should additionally be in alignment with the heat-emitting elements in accordance with a preferred embodiment. The radiator elements provided adjacent the heat-emitting elements will, accordingly, be exposed relative to the air passage openings formed in the lower housing component and in the upper housing component. Due to the fact that the stiffening struts have a width that corresponds essentially to the width of the heat-emitting elements, as suggested according to another preferred embodiment of the present invention, the unhindered flow of air through the electric heating device can be improved still further. According to the above-mentioned preferred embodiments, the above-mentioned stiffening struts extend only in the longitudinal direction of the radiator elements. If the heating device according to the present invention is, however, implemented as a particularly powerful, large heating device, the stiffening struts may also extend in the form of a grid across the openings formed in the lower and in the upper housing component.

In order to make mounting as simple as possible, another preferred embodiment of the present invention suggests that the lower housing component and the upper housing component should be in locking engagement. According to an expedient embodiment and with respect to the best possible release force of the elements establishing the locking engagement, a detent lug which, in the mounted position, cooperates with the housing is formed on the free end of the displacer. For obtaining an outer contact surface which is as smooth as possible, the detent lug is accommodated in the housing in the mounted position. In order to achieved this, a preferred further development of the present invention suggests that the countersurface, on which the detent lug abuts in the mounted position, should be formed on the lower housing component at an inwardly displaced position.

According to an expedient embodiment which aims at reducing the manufacturing costs of the electric heating device, it is suggested that the spring element should be made of a sheet-metal part with spring segments projecting therefrom. Such a spring element can be produced at a reasonable price by means of punching.

In order to prevent an undesirable displacement of the elements of the layered structure when the displacer is introduced, it is suggested, according to another preferred embodiment, that the spring segments should be held on said sheet-metal part such that they are movable in the direction of insertion. In the case of this embodiment, the spring travel that has taken place during pretensioning of the spring, i.e. during insertion of the displacer in the lower housing component, can be compensated in the direction of insertion. The above requirements are expediently fulfilled by a spring element having spring segments that are formed by punched parts which are convex in the direction of insertion and one end of which is connected to the sheet-metal strip. The spring segments are formed integrally with the spring element which can be produced at a reasonable price by simple punching and which, being a one-piece component, can be introduced in the housing with little handling and positioning effort.

In order to obtain a good areal contact and a high contact pressure between the PTC heating elements and their neighbouring contact surfaces, another preferred embodiment of the present invention suggests that at least one spring segment should be provided for each position of a PTC heating element. Furthermore, in order to increase the spring force, it proved to be advantageous to provide at least two spring segments for each position of a PTC heating element.

The insertion of the elements defining the layered structure and the subsequent tensioning of the elements by insertion of the displacer is made easier by a spring contact surface which is defined on the lower housing component such that it is inclined towards the inner side of the housing in the direction of insertion. On the basis of this structural design it is possible to insert first the elements defining the layered structure into the housing and to reduce the remaining amount of play of the layered structure within the housing already during insertion of the spring by bringing said spring into contact with the spring contact surface, since, due to the inclined spring contact surface, the spring element will already be moved towards the layered structure during insertion into the lower housing component. The displacer is preferably inserted on the spring side facing away from the layered structure between the spring and a wall of the housing and acts through passage openings formed in the spring contact surface against a respective spring segment. According to this preferred embodiment, each individual one of the spring segments is pressed against the layered structure by a displacer associated with the spring segment in question so that the entire contact pressure achieved will be comparatively high.

In order to avoid mounting errors in the production of the electric heating device, it is suggested, in accordance with a further preferred embodiment of the present invention, that the lower housing component should have formed therein insertion guide means. These insertion guide means extend in the direction of insertion, and the lower housing component has formed therein a complementary insertion guide means for each displacer provided on the upper housing component. During mounting, it will only be necessary to align the respective displacers with the insertion guide means associated therewith so as to guarantee accurate insertion of the displacers into the lower housing component.

As far as mounting is concerned, it proved to advantageous to implement the lower housing component such that its height corresponds to approximately 60 to 75% of the overall height of the housing. This structural design of the lower housing component provides a sufficient height and, consequently, a sufficiently large frame with lateral surfaces encompassing the layered structure so that the lower housing component will already provide a reliable abutment for said layered structure during compression of the layered structure when the displacer penetrates, i.e. when the housing has not yet been fully mounted. Practical tests have shown that a height of the lower housing component that amounts to approx. ⅔ of the overall height of the housing is particularly advantageous.

For obtaining a structural design of the electric heating device which is as moderate in price as possible, a preferred embodiment of the present invention suggests that the housing should be composed of two housing components produced by means of injection moulding. According to this preferred embodiment, the housing is formed of the two housing components, viz. the upper and the lower housing component. Other housing components are dispensed with for the sake of easy handling during the mounting operation of the electric heating device. These two housing components define, when mounted, a plug reception means that is formed integrally with the housing. The plug reception means can be provided exclusively on the first or on the second housing component, but the respective parts thereof may also be provided on both housing components.

For easy mounting of the electric heating device, it is additionally suggested, in accordance with another preferred embodiment of the present invention, that the plug reception means should be provided on an end face of the layered structure and that the layered structure and the plug reception means should have provided between them a fastening flange defined by flange segments that are formed integrally with the housing components.

The present invention additionally provides a housing for an electric heating device of the above-mentioned type according to claim 24.

Furthermore, the present invention suggests a method for producing an electric heating device. The method according to the present invention comprises the step of inserting first the parts defining the layered structure, viz. the at least one heat-emitting element and the at least one radiator element, into the lower housing component without pretension. This layered structure accommodated in the lower housing component is pretensioned by inserting a displacer into the lower housing component. The pretension can be achieved in that a spring element is inserted, together with the components of the layered structure, into the lower housing component, said spring element being first placed in said lower housing component without pretension and being then pretensioned during insertion of the displacer. Alternatively, it is also possible to elastically deform the longitudinal legs themselves, i.e. parts of the housing, by insertion of the displacer so as to pretension the layered structure. Also in the case of this variant the elements of the layered structure are inserted without pretension, i.e.—in contrast to the teaching disclosed by DE 197 06 199—the housing is not subjected to pretension.

Further advantageous embodiments of the present invention represent the subject matters of the subclaims.

BRIEF DESCRIPTION OF THE DRAWINGS

In the following, a preferred embodiment of the present invention will be explained in detail making reference to the drawings, in which.

DETAILED DESCRIPTION OF THE PREFERRED EMBODIMENTS

Figure 1:
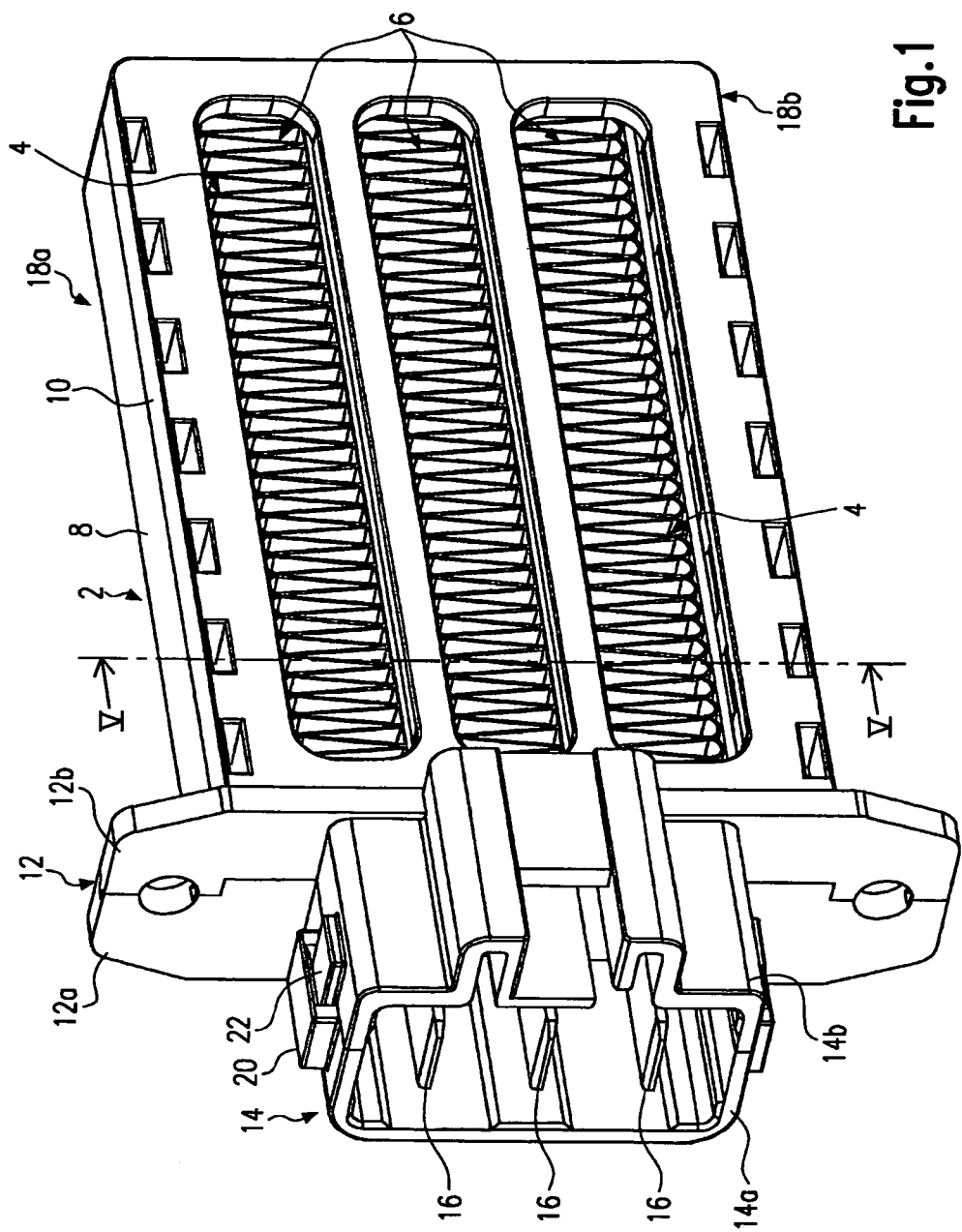
FIG. 1 shows a perspective view of an embodiment of an electric heating device.

FIG. 1 shows a perspective view of an embodiment of the electric heating device according to the present invention, comprising a housing 2 defining towards the side faces thereof three respective openings 4 at which radiator elements 6 accommodated in said housing are exposed. The housing 2 is composed of a lower housing component 8 and of an upper housing component 10 which are joined in the area of the radiator elements so as to form a substantially box-shaped component. One of the end faces of said substantially box-shaped housing 2 has provided thereon a fastening flange 12 bordering directly on said box-shaped housing 2 on one side thereof and carrying a plug reception means 14 on the other side thereof. In said plug reception means 14, contacts 16 are exposed. The plug reception means 14 as well as the fastening flange 12 are composed of two segments a, b which are each formed integrally with the upper housing component 10 and the lower housing component 8, respectively. A respective housing component 8, 10 defines together with a respective fastening flange segment 12a, 12b and a plug reception means segment 14a, 14b an injection-moulded part 18 made of plastic material. As will be explained in detail hereinbelow, the injection-moulded parts 18 are locked against displacement relative to one another by detent connections. FIG. 1 shows a locking shackle 20 formed on the plug reception means segment 14a as well as a locking flange 22 formed on the plug reception means segment 14b and engaging said locking shackle.

Figure 2:
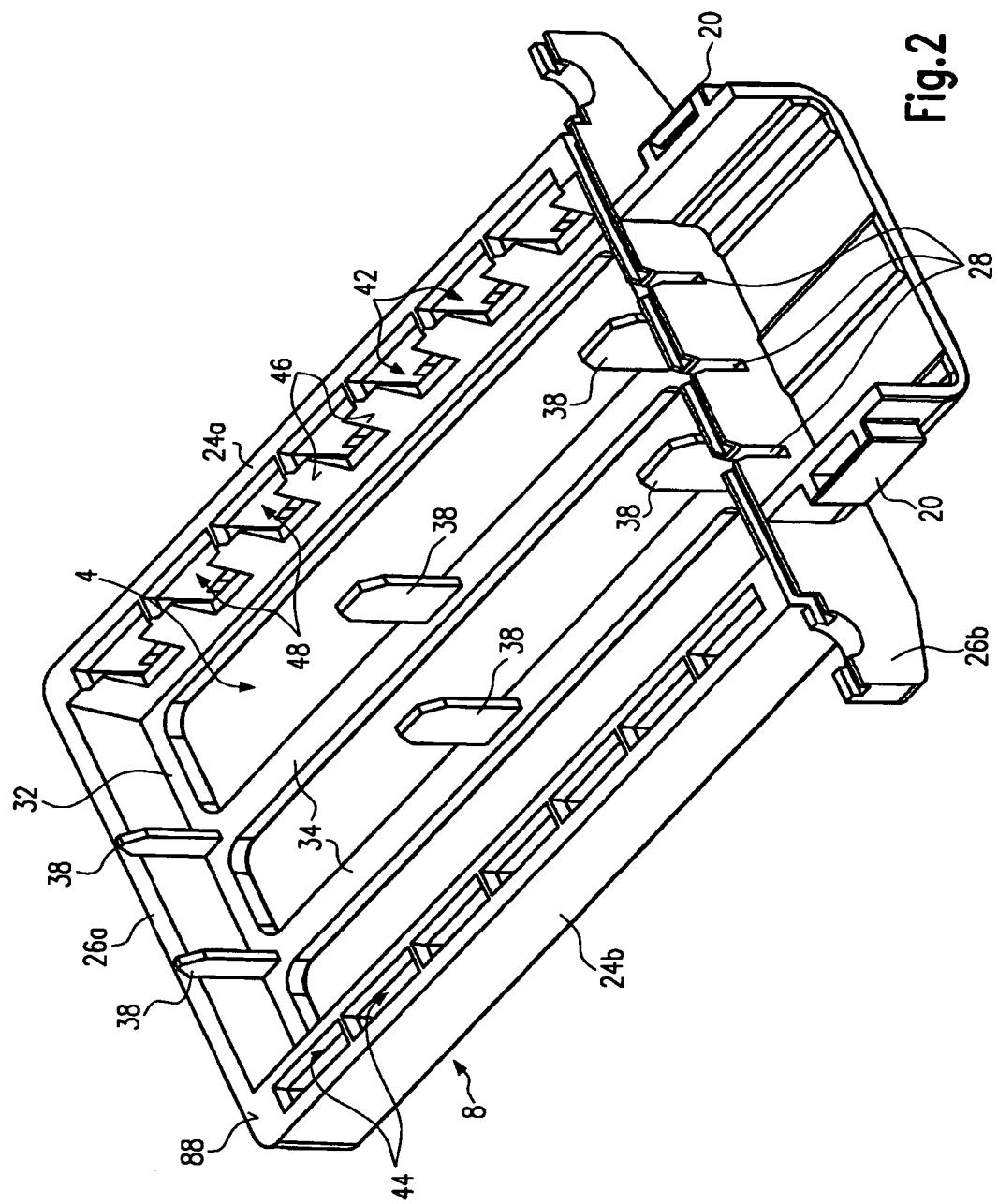
FIG. 2 shows a perspective top view of a lower housing component of the embodiment shown in FIG. 1.

FIG. 2 shows the lower housing component 8 of the embodiment shown in FIG. 1. The lower housing component is substantially trough-shaped with a rectangular basic shape and it comprises two longitudinal legs 24a, 24b and two transverse legs 26a, 26b, which extend at right angles to said longitudinal legs. The flange-side transverse leg 26b is provided with a plurality of openings 28 for accommodating sheet-metal strips 30a, 30b, 30c, which define the contacts 16 and which can be seen in FIG. 3; these sheet-metal strips will be discussed in detail hereinbelow.

A base 32 provided on the lower side of the lower housing component 8 has formed therein three openings 4 which are delimited by stiffening struts 34 extending parallel to the longitudinal legs 24a, 24b. The stiffening struts 34 are implemented such that their thickness corresponds to that of the base 32, and they interconnect the two transverse legs 26a, 26b on the lower surface of the lower housing component 8. The base 32 as well as the stiffening struts 34 define, towards the interior of the lower housing component 8, contact surfaces for a layered structure 80 which will be described in detail hereinbelow (cf. FIG. 3). In the longitudinal direction of the stiffening struts 34, plate-shaped positioning means 38 project from said stiffening struts 34, said positioning means 38 extending parallel to the longitudinal legs and having bevelled ends so as to define, together with opposed positioning means 38, a tapering reception slot 40 when the layered structure 80 is being assembled. The plate-shaped positioning means 38 project beyond the upper edge of the frame defined by the longitudinal and transverse legs 24, 18.

The longitudinal legs 24a, 24b are implemented such that they are broader than the transverse legs 26 and they comprise two leg portions which extend parallel to one another and which are interconnected via webs after the fashion of a honeycomb structure so as to implement insertion guide means 42. Said insertion guide means 42 have upper openings which are located on the upper surface of the longitudinal legs 24 and which are increased in width in a frusto-conical shape so as to define lead-in funnels 44. The inner surface of the longitudinal leg 24a which is exposed towards the inner side of the lower housing component 8 defines a spring contact surface 46. This spring contact surface 46 extends at an oblique angle to the opposite inner surface of the other longitudinal leg 24b and is cut free in a U-shape in the area of each of the insertion guide means 42 so as to form passage openings 48. The longitudinal leg 24b has additionally formed thereon a plurality of contact webs 36 protruding beyond the inner surface of said longitudinal leg 24b and projecting into the lower housing component 8 on the same level.

Figure 3:
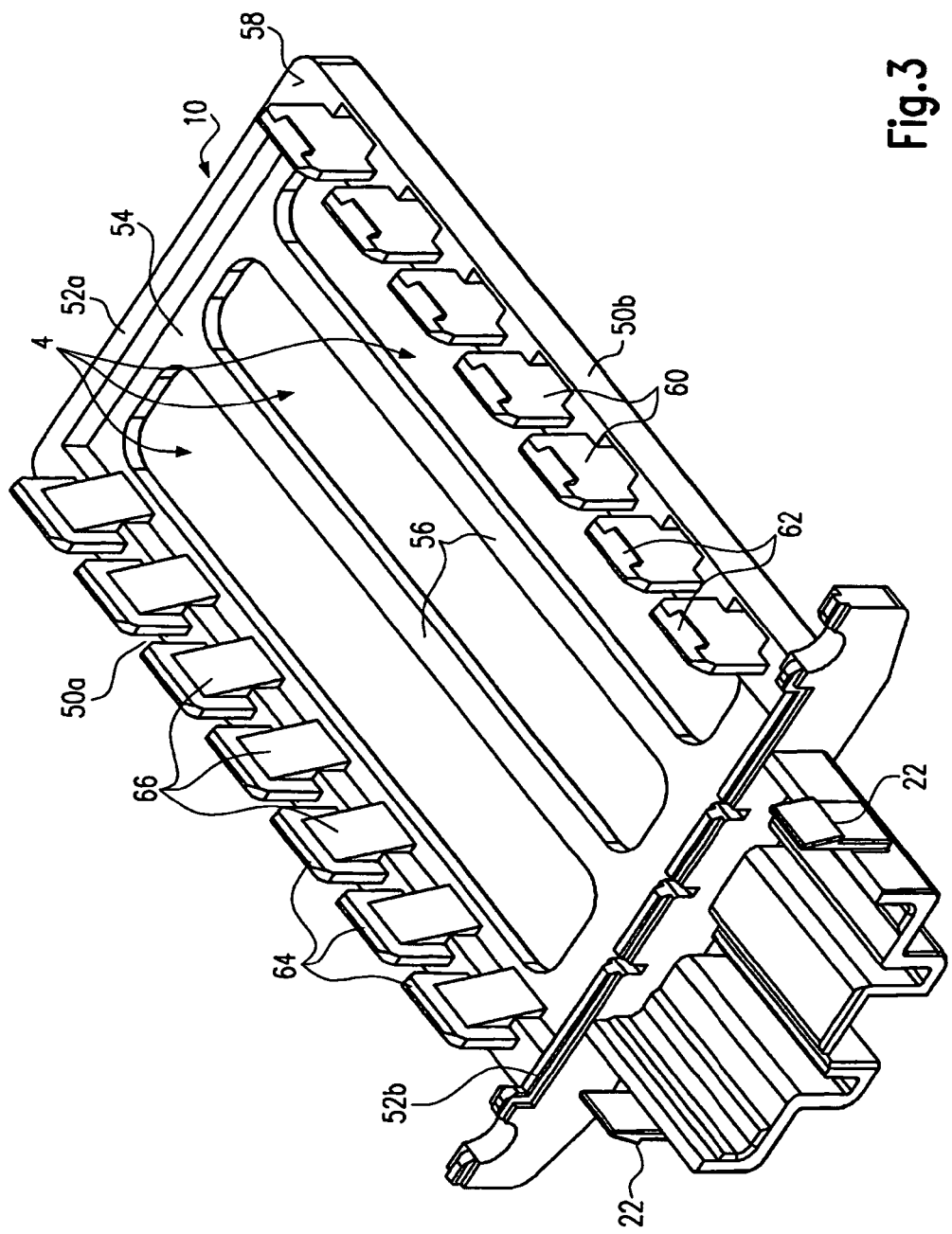
FIG. 3 shows a perspective top view of an upper housing component of the embodiment shown in FIG. 1.

FIG. 3 shows a representation of the upper housing component 10 corresponding to the perspective representation according to FIG. 2. The upper housing component 10 has a frame-like structure whose height is lower than the height of the lower housing component 8 and which is defined by two longitudinal webs 50a, 50b and by transverse webs 52a, 52b arranged at right angles to said longitudinal webs. The height of the longitudinal and transverse webs 50, 52 of the upper housing component amounts, in the embodiment shown, to one third of the overall height of the housing 2, and the height of the corresponding longitudinal and transverse legs 24, 26 of the lower housing component 8 amounts to approximately two thirds of said overall height. The upper housing component 10 has a base 54 which is implemented with three openings 4 and with stiffening struts 56 extending between these openings and which corresponds substantially to the base 32 of the lower housing component 8.

Seven detent tongues 60 project from a surface of the longitudinal and transverse webs 50, 52 which defines a circumferentially extending contact surface 58, said detent tongues 60 projecting in the area of the transverse web 50b and having free ends which taper in the longitudinal as well as in the transverse direction, the roof of the detent tongues merging at the outer upper end thereof with a detent lug 62 formed on the outer surface of the detent tongues. The other longitudinal web 50a of the upper housing component 10 has formed thereon seven webs, or displacers, 64, which project beyond said longitudinal web and which define on the inner surface thereof a respective mn-down ramp 66 that increases in width towards the base 54 of the upper housing component. The run-down ramps 66 have a width which is slightly smaller than the width of the passage openings 48 of the lower housing component. Also the webs 64 taper in the longitudinal as well as in the transverse direction at the free ends thereof and, like the detent tongues 60, they define on the outer surface thereof detent lugs 68 which cannot be seen in FIG. 3. These detent lugs 68 are clearly visible in FIG. 5 and 6 and in these figures it can also be seen that the webs 64 project beyond the contact surface 58 with the same length as the detent tongues 60. The webs 64 as well as the detent tongues 60 have a flat back 70, 72 which extends at right angles to the contact surface 58.

Figure 4:
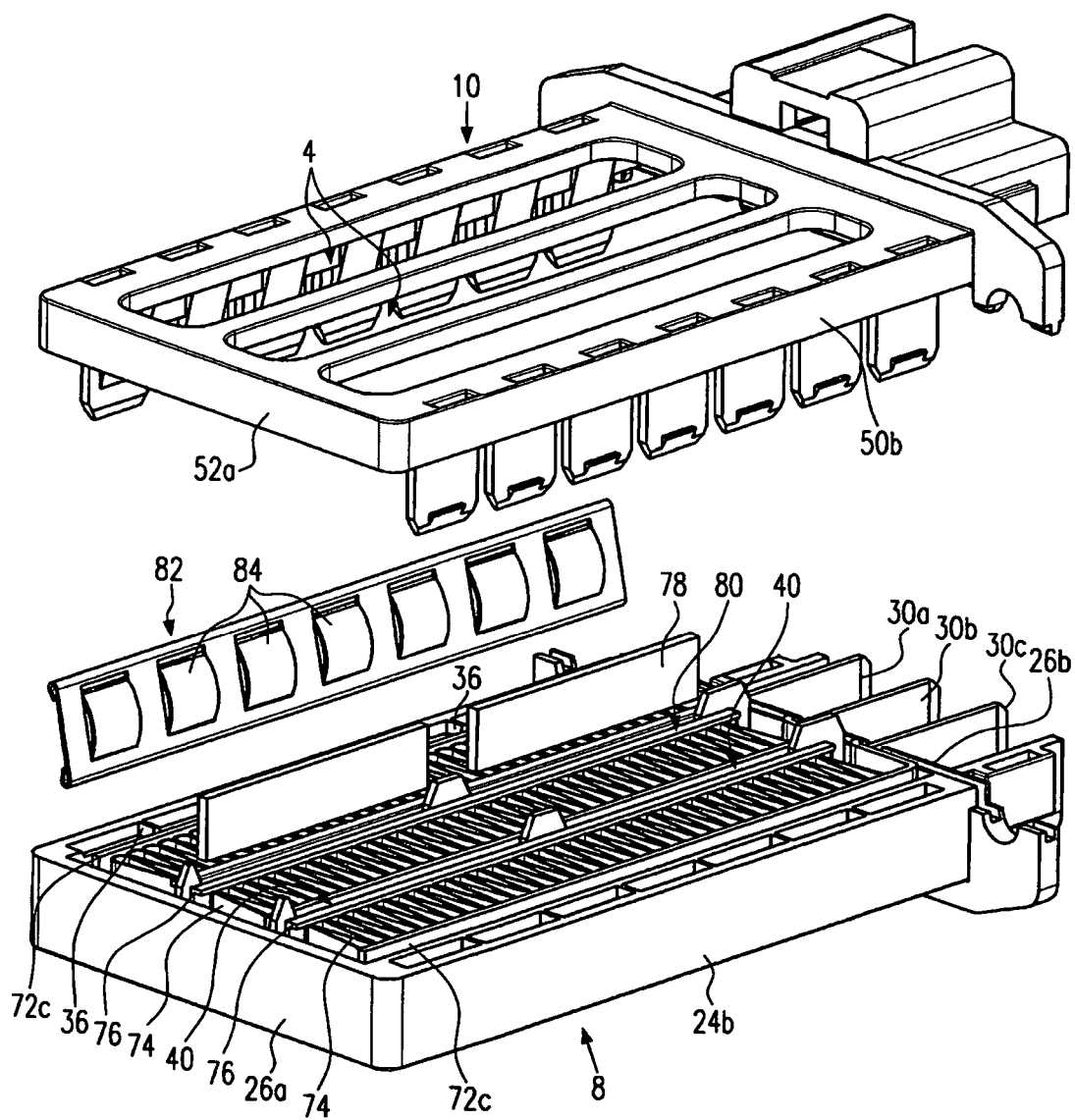
FIG. 4 shows an exploded view of the embodiment shown in FIG. 1, during mounting, with essential elements of the heating device according to the present invention.
Figure 5:
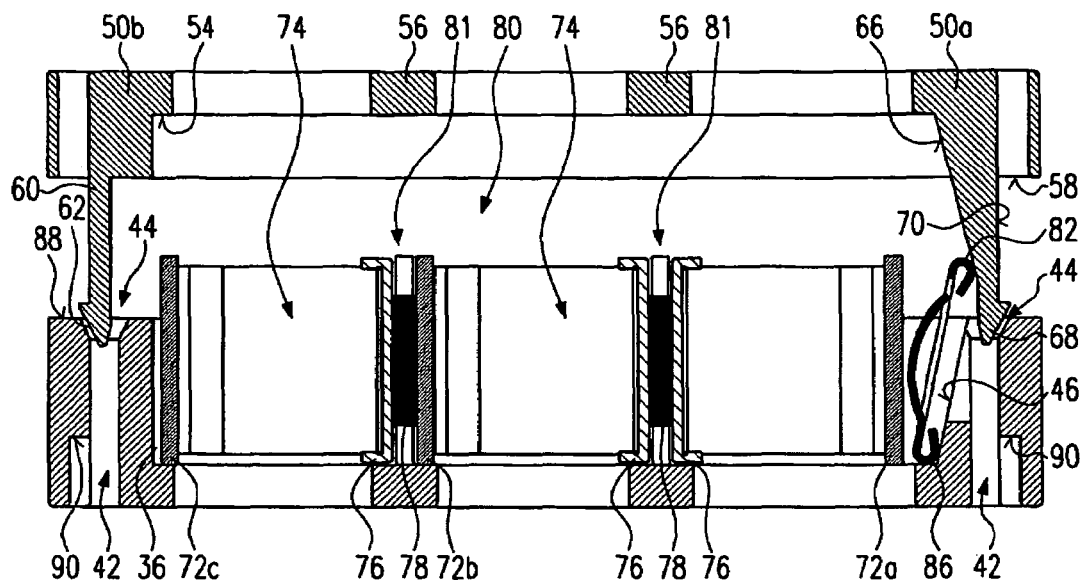
FIG. 5 shows a view of a longitudinal section along line IV-IV according to the representation in FIG. 1 during mounting of the embodiment.
Figure 6:
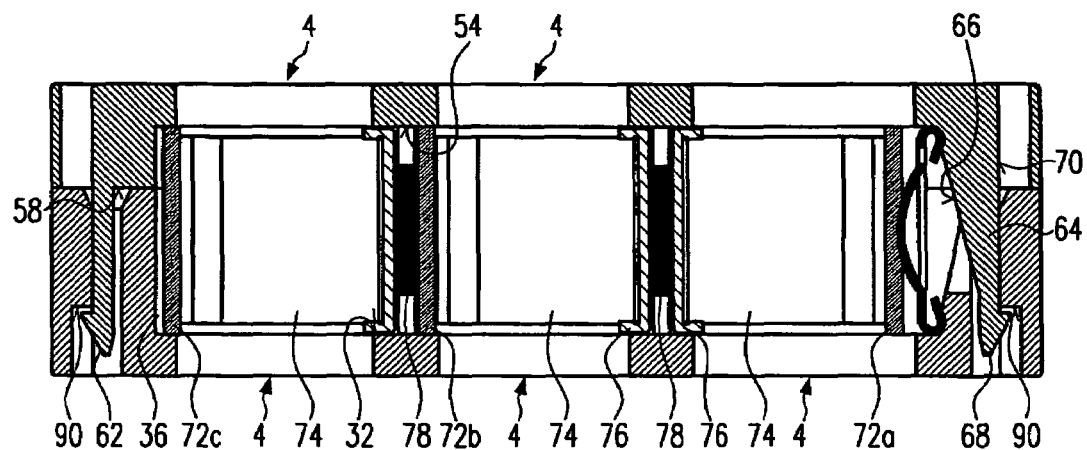
FIG. 6 shows the sectional view according to FIG. 5, when mounting has been finished.

Referring especially to FIG. 4 to 6, it will be explained hereinbelow how the embodiment shown in the figures in mounted.

To begin with, the lower housing component has inserted therein bent sheet-metal strips 72a to 72c. The lower housing component 8 has also inserted therein corrugated-rib radiator elements 74 formed of meandrous aluminium sheet-metal strips in the case of the present embodiment. These radiator elements 74 have been connected to radiator sheet-metal strips 76 in a preceding production step, said radiator sheet-metal strips 76 having a U-shaped cross-section and encompassing the radiator elements 74 at the end faces thereof. Each reception means associated with one of the openings 4 has inserted therein a radiator element 74 with the associated radiator sheet-metal strip 76 as well as a sheet-metal strip 72. The sheet-metal strips 72 are bent at the end thereof in such a way that their free ends are exposed in the area of the plug reception means 14 where they define the sheet-metal strips 30a to 30c. The length of the radiator sheet-metal strips 76 is chosen such that, even in the case of a minor displacement of the radiator elements 74 in the lower housing component 8, said radiator sheet-metal strips 76 cannot come into contact with the sheet-metal strips 72a to 72d extending in the area of the transverse web 26b parallel to said transverse web.

When the radiator elements 74 as well as the sheet-metal strips 72 and the radiator sheet-metal strips 76 have been inserted into the lower housing component 8, PTC heating elements 78, which are shown in FIG. 4, are inserted into the reception slots 40 defined between the positioning means 38 and the sheet-metal strips 72, 76 which extend in parallel. The PTC heating elements 78 have a larger thickness than the web-shaped positioning means 38. The radiator elements 74 as well as the sheet-metal strips 72, 76 are, at this time, accommodated in the lower housing component 8 with a certain amount of play and can therefore be displaced in the transverse direction so as to provide sufficient space for installing the PTC heating elements. The positioning means 38 are arranged on the lower housing component 8 in such a way that they do not obstruct the transverse movement of the sheet-metal strips 72, 76 and of the radiator elements 74 which is necessary for the purpose of mounting. When all the PTC heating elements 78 have been inserted between the parallel extending sheet-metal strips 72, 76 into the reception slots 40, the lower housing component 8 accommodates therein a layered structure 80 comprising the PTC heating elements 78, the radiator elements 74 as well as the sheet-metal strips 72 and the radiator sheet-metal strips 76. This layered structure 80 is held in the lower housing component 8 without pretension. In said layered structure, the sheet-metal strips 72, 76, together with the PTC heating elements 78 arranged therebetween, define heat-emitting elements 81. A spring element 82 shown in FIG. 4 is now oriented parallel to the longitudinal legs 24 and placed in the lower housing component 8 between the outer surface of the layered structure 80 and the spring contact surface 46. In view of the fact that the spring contact surface 46 is inclined towards the layered structure 80, a reception space for the spring element 82 is defined, said reception space tapering towards the base 32 of the lower housing component 8 and facilitating insertion of the spring element 82, said spring element 82 being, however, already located very close to the layered structure 80 at the end of the insertion movement.

As can be seen from the representation in FIG. 4, the spring element 82 is defined by a sheet-metal strip having formed thereon, by means of punching, a plurality of spring segments 84 whose number corresponds to the number of webs 64. The individual spring segments 84 are convex towards the layered structure 80. On their base-side lower surface, said spring segments 84 are fixedly connected to the sheet-metal strip of the spring element 82. On the opposite upper surface, the spring segments 84 are cut free. This allows the spring segments 84 to move in the direction in which all the components are inserted into the lower housing component 8, i.e. in a direction at right angles to the plane of the layered structure 80.

Now, the upper housing component is positioned as shown in FIG. 5; at this position, the detent tongues 60 and the webs 64 are in alignment with the insertion guide means 42 associated therewith. The webs 64 and the detent tongues 60 are now inserted in the lower housing component 8 in a direction perpendicular to the plane of the layered structure. In the course of this process, the bevelled surfaces of the detent lugs 62, 68 come first into contact with the outwardly inclined surfaces of the lead-in funnels 44. The detent tongues 60 and the webs 64 are elastically pretensioned relative to the longitudinal web 50 in this way. Furthermore, the upper bent end of the spring element 82 slides on the run-down ramp 66 whereby it is pivoted towards the layered structure 80 about a support 86 formed on the base of the lower housing component. Due to this pivoting movement, the individual spring segments 84 come into contact with the outer side face of the layered structure 80, which is formed by the sheet-metal strip 72*c* in the case of the present embodiment. When the insertion movement is continued, the spring element 82 is pivoted further about the support 86, whereby gaps remaining within the layered structure 80 are first closed and the individual elements of the layered structure 80 are brought into areal contact with one another. The layered structure then abuts against the longitudinal leg on the contact web 36. The pressure applied by the spring element 62 is counteracted by the lower housing component 8 via this contact web 36. When the insertion movement of the web 64 continues, the spring element is pivoted further about the support 86. The spring segments 84, which are already in contact with the outer surface of the layered structure 80, are elastically pretensioned towards the sheet-metal strip in the course of this pivotal movement. The insertion movement, i.e. the movement by which the upper housing component 10 is pushed onto the lower housing component 8, ends when the contact surface 58 of the upper housing component abuts on the corresponding countersurface 88 formed on said upper housing component 10 (cf. FIG. 6). At the end of the insertion movement, the detent lugs 62, 68 have been moved past the detent countersurfaces 90, which are oriented at right angles to the insertion guide means 42 and which open into said insertion guide means 42. The elastic tensions imparted to the webs 64 and the detent tongues 60 have relaxed in the course of this movement. The webs 64 and the detent tongues 60 have been pivoted outwards so as to establish a locking connection between the lower housing component 8 and the upper housing component 10.

In the mounting position that has now been reached, the upper end of the spring element 82 abuts on the transition between the base 54 and the run-down ramps 66. The respective run-down ramps 66 are located within the passage openings 48 defined in the spring contact surface 46. Each of the run-down ramps 66 pretensions an individual spring segment 84 against the layered structure 80. Since the spring segments 84 and the webs 64 are arranged such that they are distributed over the entire length of the longitudinal legs 24, a uniform pretension over the entire length of the layered structure 80 will be obtained. The pretension applied to the layered structure 80 is counteracted on the spring side by contact between the back 70 and the longitudinal leg 24 in the area of the insertion guide means 42, and is introduced in the housing 2. The layered structure, which is pretensioned by the webs 64 held in the mounting position, is, due to insertion of said webs 64, now held under pretension in the lower housing component 8. The top of the lower housing component is covered by the base 54 of the upper housing component 10 so that the elements of the layered structure 80 are captively accommodated in the housing 2. The surface of the base 54 abuts on the end faces of the positioning means 38. Also the end faces of the sheet-metal strips 72 and of the radiator sheet-metal strips 76 abut on the opposed surfaces of the bases 32 and 54 of the lower and upper housing components 8, 10 or are secured in position relative to these surfaces in closely spaced relationship therewith.

The present invention is not limited to the embodiment shown. It is, for example, imaginable to provide the spring element as an integral component of the housing 2, in particular as an integral component of the longitudinal leg 24 and of the longitudinal web 50, respectively. In addition, from the point of view of production technology it may be preferred to implement a spring element as a component which is formed integrally with the lower housing component 8 or the upper housing component 10, said housing components being produced by means of injection moulding. Furthermore, it is imaginable to provide, instead of the webs with the run-down ramps, flat tongues on the upper housing component or on another part which is adapted to be connected to the lower housing component, said flat tongues being introduced in the lower housing component in a direction essentially perpendicular to the layered structure and cooperating with wedge-shaped countersurfaces provided laterally adjacent the layered structure. The elastic pretensioning of the layered structure by insertion of a displacer can, in principle, take place at any point between the elements of the layered structure. The embodiment shown in the figure is, however, advantageous insofar as the heating device has a comparatively compact structural design and the spring element 82 is provided in the boundary area of the housing 2 where a border of enlarged width should, in any case, be provided as a contact surface for installing the electric heating element in an air duct. In the embodiment shown, the width of the stiffening struts 34 and 56 corresponds approximately to the width of the individual heat-emitting elements 81, which are each formed by the PTC heating elements 78 arranged in sequence one after the other and by the sheet-metal strips 72 and 76 abutting thereon. In the embodiment shown in FIG. 6, the left heat-emitting element 81 is defined by a radiator sheet-metal strip 76, two PTC heating elements 78 and a sheet-metal strip 72. The heat-emitting element 81 shown on the right-hand side comprises two radiator sheet-metal strips 76 with intermediate PTC heating elements 78.

The embodiment shown in the drawing is operated in a conventional manner by applying a voltage thereto via the contacts 16; for example, the middle sheet-metal strip 30*b* can be grounded, whereas the sheet-metal strips 30a, 30c are connected to a voltage source via a control unit. By applying a voltage, the two radiator elements located between the sheet-metal strip 72b and the outer sheet-metal strip 72c can be heated selectively by the heat-emitting elements 81. A smaller amount of heat will be obtained when the voltage is applied between the sheet-metal strip 72a and the sheet-metal strip 72b. In this case, the heat produced by the heat-emitting elements 81 is transferred via a radiator element 74 to the air flowing through the heating device. When the voltage is applied to both sheet-metal strips 30a, 30c, the maximum amount of heat will be emitted.

We claim:

1. An auxiliary heating device for motor vehicles, comprising:
an open housing accommodating a layered structure which includes at least one radiator element and at least one heat-emitting element, the heat emitting element including at least one PTC heating element, and further accommodating at least one spring element providing a pretensioning force which pretensions said layered structure, a plurality of contacts being held in said housing in an insulating manner and electrically connected to the at least one PTC heating element, wherein
the housing comprises a lower housing component and at least one displacer which, for applying the pretensioning force, is adapted to be inserted into said lower housing component in a direction approximately perpendicular to the plane of the layered structure and which, in a mounted position, is secured in position relative to said lower housing component, wherein said at least one displacer is adapted to apply a biasing force transversely across the housing by compressing the spring element when the displacer is inserted into said housing such that, while the displacer is being inserted into the housing, the displacer slides across and correspondingly pretensions the spring element, eliminating a certain amount of play between individual elements of the layered structure and the spring, and wherein when the housing is fully assembled, the spring element (i) is located and compressed between the layered structure and the displacer, and (ii) applies the pretensioning force to the layered structure.

2. The auxiliary heating device according to claim 1, wherein the displacer is wedge-shaped.

3. The auxiliary heating device according to claim 1, wherein the displacer comprises a web which, in the mounted position thereof, projects up to and into the plane of the layered structure.

4. The auxiliary heating device according to claim 3, wherein the spring element is provided on at least one border of the layered structure and the web comprises at least one run-down ramp tapering in the direction of insertion and cooperating with the spring element.

5. The auxiliary heating device according to claim 4, wherein, in the mounted position thereof, the web back facing away from the run-down ramp abuts on the lower housing component.

6. The auxiliary heating device according to claim 1, further comprising positioning means, arranged on the lower housing component, for prefixing the PTC heating element.

7. The auxiliary heating device according to claim 1, wherein the displacer is arranged on an upper housing component which, in the mounted position, is connected to the lower housing component and which encompasses the layered structure from above.

8. The auxiliary heating device according to claim 1, wherein at least one of the lower housing component and an upper housing component have stiffening struts extending across the layered structure.

9. The auxiliary heating device according to claim 8, wherein the stiffening struts are in alignment with the heat-emitting elements.

10. The auxiliary heating device according to claim 9, wherein the stiffening struts have a width that corresponds essentially to the width of the heat-emitting elements.

11. The auxiliary heating device according to claim 1, wherein the lower housing component and the upper housing component are in locking engagement.

12. The auxiliary heating device according to claim 11, wherein a detent lug which, in the mounted position thereof, cooperates with the lower housing component, is formed on a free end of the displacer.

13. The auxiliary heating device according to claim 12, wherein, in the mounted position thereof, the detent lug cooperates with a detent countersurface formed on the lower housing component at an inwardly displaced position.

14. The auxiliary heating device according to claim 1, wherein the spring element is made of a sheet-metal part with spring segments projecting therefrom.

15. The auxiliary heating device according to claim 14, wherein the spring segments are held movable in a direction of insertion on said sheet-metal part.

16. The auxiliary heating device according to claim 14, wherein the spring segments are formed by punched parts which are convex a direction of insertion and one end of each of which is connected to the sheet-metal part.

17. The auxiliary heating device according to claim 14, wherein at least one spring segment is provided for each position of one of the PTC heating elements.

18. The auxiliary heating device according to claim 17, wherein at least two spring segments are provided for each position of one of the PTC heating elements.

19. The auxiliary heating device according to claim 14, wherein the displacer is wedge-shaped.

20. The auxiliary heating device according to claim 14, wherein the displacer comprises a web which, in the mounted position, projects up to and into the plane of the layered structure.

21. The auxiliary heating device according to claim 14, wherein the spring element is provided on at least one border of the layered structure and the web comprises at least one run-down ramp tapering in the a direction of insertion and cooperating with the spring element.

22. The auxiliary heating device according to claim 21, wherein, in the mounted position thereof, the web back facing away from the run-down ramp abuts on the lower housing component.

23. The auxiliary heating device according to claim 14, further comprising positioning means, arranged on the lower housing component, for prefixing the PTC heating element.

24. The auxiliary heating device according to claim 17, wherein the lower housing component defines a spring contact surface which is inclined in the direction of insertion and which is provided with respective passage openings for the displacer in the area of the spring segments.

25. The auxiliary heating device according to claim 24, wherein the lower housing component has formed therein insertion guide means for the displacers, the insertion guides means being provided on an upper housing component and extending in the direction of insertion.

26. The auxiliary heating device according to claim 25, wherein the lower housing component has a height amounting to approximately ⅗ up to approximately ¾ of the overall height of the housing.

27. The auxiliary heating device according to claim 1, wherein the housing comprises two injection-moulded parts made of plastic material and forming a plug receptor that is formed integrally with the housing.

28. The auxiliary heating device according to claim 27, wherein the plug receptor is provided on an end face of the layered structure, and wherein the layered structure and the plug reception means have provided between them a fastening flange defined by flange segments that are formed integrally with the housing components.

29. The auxiliary heating device according to claim 27, wherein, in the mounted position thereof, a detent lug cooperates with a detent countersurface formed on the lower housing component at an inwardly displaced position.

30. The auxiliary heating device according to claim 27, wherein the spring element is made of a sheet-metal part with spring segments projecting therefrom.

31. The auxiliary heating device according to claim 30, wherein the spring segments are held movable in the direction of insertion on said sheet-metal part.

32. The auxiliary heating device according to claim 30, wherein the spring segments are formed by punched parts which are convex in the direction of insertion and one end of each of which is connected to the sheet-metal strip.

33. The auxiliary heating device according to claim 30, wherein at least one spring segment is provided for each position of one of the PTC heating elements.

34. The auxiliary heating device according to claim 22, wherein at least two spring segments are provided for each position of one of the PTC heating elements.

35. A housing for an electric heating device for auxiliary heating for motor vehicles, which serves to accommodate a layered structure that includes
at least one radiator element,
at least one heat-emitting element, the heat-emitting element including at least one PTC heating element, and
at least one spring element pretensioning said layered structure, as well as a plurality of contacts which are electrically connected to the at least one PTC heating element, the housing comprising:
a lower housing component, and
at least one displacer which, for applying the pretension, is adapted to be inserted into said lower housing component in a direction approximately perpendicular to the plane of the layered structure and which, in the mounted position, is adapted to be secured in position relative to said lower housing component, such that while the at least one displacer is being inserted into the lower housing component, the at least one displacer slides across and correspondingly pretensions corresponding ones of the at least one spring element, eliminating a certain amount of play between individual elements of the layered structure and the spring, and wherein, when the housing is fully assembled, the spring element (i) is located and compressed between the layered structure and the displacer, and (ii) applies the pretensioning force to the layered structure.

36. The housing for an electric heating device according to claim 35, wherein the displacer is wedge-shaped.

37. The housing for an electric heating device according to claim 35, wherein the displacer comprises a web which, in the mounted position thereof, projects up to and into the plane of the layered structure.

38. The housing for an electric heating device according to claim 35, wherein in the mounted position thereof, a back of the web back facing away from the run-down ramp abuts on the lower housing component.

39. The housing for an electric heating device according to claim 35, further comprising positioning means, arranged on the lower housing component, for prefixing the PTC heating element in place.

40. The housing for an electric heating device according to claim 36, wherein the displacer is arranged on an upper housing component which, in the mounted position thereof, is connected to the lower housing component and which encompasses the layered structure from above.

41. The housing for an electric heating device according to claim 36, wherein at least one of the lower housing component and the upper housing component have stiffening struts extending across the layered structure.

42. The housing for an electric heating device according to claim 41, wherein the stiffening struts are in alignment with the heat-emitting elements.

43. The housing for an electric heating device according to claim 41, wherein the stiffening struts have a width that corresponds essentially to the width of the heat-emitting elements.

44. The housing for an electric heating device according to claim 35, wherein the lower housing component and the upper housing component are in locking engagement.

45. The housing for an electric heating device according to claim 43, wherein a detent lug which, in the mounted position, cooperates with the lower housing component, is formed on a free end of the displacer.

46. The housing for an electric heating device according to claim 45, wherein, in the mounted position thereof, the detent lug cooperates with a detent countersurface formed on the lower housing component at an inwardly displaced position.

47. The housing for an electric heating device according to claim 35, wherein the lower housing component defines a spring contact surface which is inclined in the direction of insertion.

48. The housing for an electric heating device according to claim 46, wherein the lower housing component has formed therein insertion guide means for the displacers, said insertion guide means being provided on the upper housing component and extending in the direction of insertion.

49. The housing for an electric heating device according to claim 47, wherein the lower housing component has a height amounting to approximately ⅗ up to approximately ¾ of the overall height of the housing.

50. The housing for an electric heating device according to claim 47, wherein the housing comprises two injection-moulded parts made of plastic material and forming a plug receptor that is formed integrally with the housing.

51. The housing for an electric heating device according to claim 50, wherein the plug receptor is provided on an end face of the layered structure, and wherein the layered structure and the plug receptor have provided between them a fastening flange defined by flange segments that are formed integrally with the housing components.

* * * * *